United States Patent
Braghiroli

(10) Patent No.: US 7,064,818 B2
(45) Date of Patent: Jun. 20, 2006

(54) METHOD AND APPARATUS FOR DETERMINING GEOMETRICAL DATA OF A MOTOR VEHICLE WHEEL MOUNTED ROTATABLY ABOUT AN AXIS OF ROTATION

(75) Inventor: Francesco Braghiroli, Reggio Emilia (IT)

(73) Assignee: Snap-On Equipment SRL a Unico Socio (IT)

( * ) Notice: Subject to any disclaimer, the term of this patent is extended or adjusted under 35 U.S.C. 154(b) by 0 days.

(21) Appl. No.: 10/660,966

(22) Filed: Sep. 12, 2003

(65) Prior Publication Data

US 2004/0051864 A1    Mar. 18, 2004

(30) Foreign Application Priority Data

Sep. 13, 2002   (EP)   .................... 02020684

(51) Int. Cl.
  *G01C 1/00*   (2006.01)
  *G01B 11/26*  (2006.01)
(52) U.S. Cl. .................... 356/139.09; 73/460
(58) Field of Classification Search ........... 356/139.04, 356/139.09, 155; 73/460–462; 301/5.21
   See application file for complete search history.

(56) References Cited

U.S. PATENT DOCUMENTS

| | | | | |
|---|---|---|---|---|
| 5,054,918 A | * | 10/1991 | Downing et al. | 356/139.09 |
| 5,731,870 A | * | 3/1998 | Bartko et al. | 356/139.09 |
| 6,244,108 B1 | | 6/2001 | McInnes et al. | |
| 6,414,304 B1 | * | 7/2002 | Boess et al. | 250/231.13 |
| 6,532,062 B1 | * | 3/2003 | Jackson et al. | 356/139.09 |
| 6,657,711 B1 | * | 12/2003 | Kitagawa et al. | 356/155 |
| 2002/0018218 A1 | * | 2/2002 | Conheady et al. | 356/602 |

FOREIGN PATENT DOCUMENTS

| | | |
|---|---|---|
| EP | 0 247 350 B1 | 1/1990 |
| EP | 1 174 698 A2 | 1/2002 |
| WO | WO 00/14503 | 3/2000 |

\* cited by examiner

*Primary Examiner*—Thomas H. Tarcza
*Assistant Examiner*—Isam Alsomiri
(74) *Attorney, Agent, or Firm*—Ostrolenk, Faber, Gerb & Soffen, LLP

(57) ABSTRACT

A method and an apparatus for determining geometrical data of a motor vehicle wheel 2 mounted rotatably about an axis of rotation 1, in which in at least two planes 19, 20 which are perpendicular to the axis of rotation 1, the distances of a plurality of measurement points on a respective periphery of the corresponding part of the wheel (wheel rim 9) from a reference location 5 and the rotary angle positions of the respective measurement points are measured and the position of the motor vehicle wheel 2 with respect to the axis of rotation 1 is determined from the measurement values.

17 Claims, 2 Drawing Sheets

METHOD AND APPARATUS FOR DETERMINING GEOMETRICAL DATA OF A MOTOR VEHICLE WHEEL MOUNTED ROTATABLY ABOUT AN AXIS OF ROTATION

BACKGROUND OF THE INVENTION

The invention concerns a method of determining geometrical data of a motor vehicle wheel mounted rotatably about an axis of rotation and an apparatus for carrying out that method.

A method and an apparatus of that kind are known from EP 1 174 698 A2. In the known method and the known apparatus the motor vehicle wheel which can be fixed rotatably on the main shaft of a wheel balancing machine is scanned in a contactless mode, for example by means of a laser beam. The reflected beam is received by a position-sensitive receiver and the spacing of the scanned measurement points is measured. The spacings between a plurality of measurement points are used to determine the profile of the motor vehicle wheel, in terms of optimising the balancing operation.

When fixing the motor vehicle wheel to a rotatable wheel mounting, for example the main shaft of a wheel balancing machine or to the rotatable wheel fixing of a motor vehicle wheel or another wheel fixing, there is the danger that the geometrical axis of the wheel does not coincide with the axis of rotation about which the wheel rotates, for example in an unbalance measuring run or while the motor vehicle is travelling. The geometrical axis of the wheel can be eccentric with respect to the axis of rotation and/or can involve an angle of inclination relative to the axis of rotation.

SUMMARY OF THE INVENTION

The object of the invention is to provide a method and an apparatus of the kind set forth in the opening part of this specification, with which the position of the motor vehicle wheel can be determined in a simple manner.

The invention provides that the spacings of a plurality of measurement points from a reference location are measured. Those measurement points are disposed on at least two peripheries which are in two planes perpendicular to the axis of rotation about which the motor vehicle wheel is rotated. The rotary angle positions of the respective measurement points are also measured or determined. The position of the motor vehicle wheel with respect to the axis of rotation is determined from the measurement values for the respective distances of the measurement points and the associated rotary angle positions. That operation of determining the position of the motor vehicle wheel makes it possible to determine in particular the eccentricity and/or the angle of inclination of the geometrical axis of the wheel, with respect to the axis of rotation about which the motor vehicle wheel rotates.

In addition radial wobble or run-out of the wheel can be ascertained in particular from measurement values for measurement points which are on a surface which is substantially parallel to the axis of the wheel. Information for determining the lateral wobble or run-out of the wheel can be obtained from measurement values for measurement points which are on surfaces of the wheel which are disposed inclinedly or perpendicularly with respect to the axis of the wheel.

The geometrical data obtained in that way can be used, in particular in an unbalance measurement procedure, to determine correction values for the balancing parameters (balancing weight and angular position). In addition the measurement values can be utilised in wheel position measurement in respect of motor vehicle wheels when mounted on the vehicle.

The unbalance measurement data of one measuring run and the run out data particularly of the rim of the vehicle wheel obtained in a first positional relationship of the tyre and the rim of the vehicle wheel can be analysed by computing to match mount the tyre on the rim in a second position, wherein the effects of the run out and of the wheel unbalance are minimized. By rotating (matching) the tyre on the rim from the first rotational position to the second rotational position a positional relationship can be adjusted where the forces created by the unbalance counteract against the effects of the run out of the rim to minimize vibrations. The optimisation of the smooth running of the vehicle wheel can be performed by aligning the high spot of the run out with the low spot of the tyre (EP 0 247 350).

It is also possible to measure the distances of measurement points on the tyre of the motor vehicle wheel, relative to a reference location, at different inflation pressures. The differences in the distance measurement values for the respective measurement points make it possible to obtain information about different degrees of tyre stiffness of the pneumatic tyre on the motor vehicle wheel. The measurement points can be on different peripheral lines about the axis of rotation at the side walls or the tread surface of the pneumatic tyre. An optimisation of the smooth running of the wheel can be reached by aligning the low spot of the run out of the rim with the hardest spot of the stiffness of the tyre.

A triangulation measuring device known from EP 1 174 698 A2 can preferably be used for scanning and distance measurement. That triangulation measuring device not only makes it possible to determine the profile of the disc wheel and in particular the wheel rim, as is used for optimising the balancing operation, but it is also possible to determine a position of the rotatably supported motor vehicle wheel, in particular the position of its geometrical wheel axis with respect to the axis of rotation. Particularly in regard to measuring the unbalance of the motor vehicle wheel, accurate balancing parameters are achieved, in regard to which eccentric mounting of the motor vehicle wheel on the main shaft of the wheel balancing machine is also compensated. It is also possible to determine geometrical deformation of the wheel such as lateral and radial wobble or run-out. In addition it is possible to determine irregularities of the pneumatic tyre, in particular irregularities in tyre stiffness, as explained above. That therefore provides a comprehensive diagnosis of the quality of the motor vehicle wheel.

BRIEF DESCRIPTION OF THE DRAWINGS

The invention will be described in greater detail hereinafter with reference to the Figures in which.

DETAILED DESCRIPTION OF THE INVENTION

Figure 1:
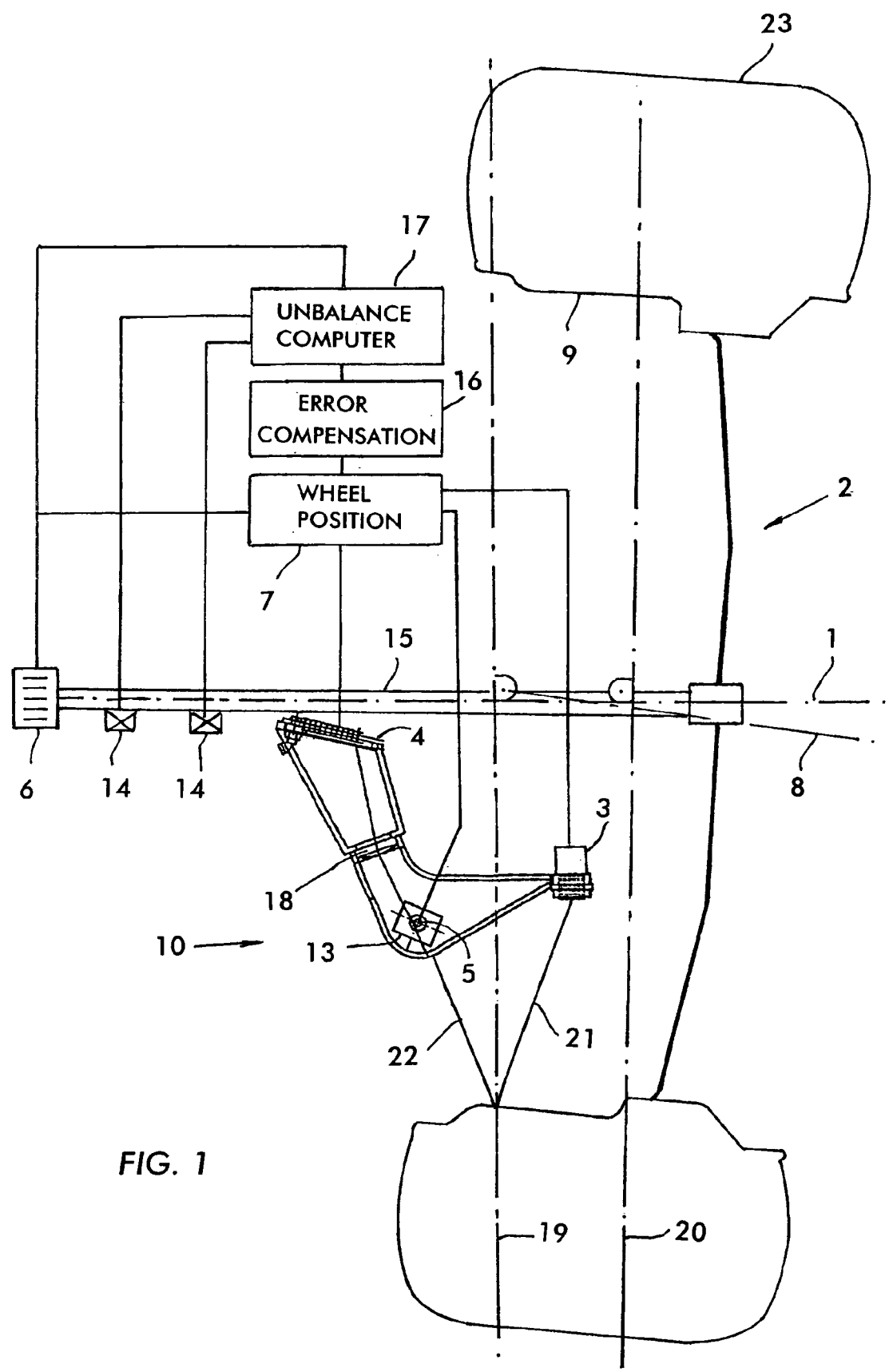
FIG. 1 shows a first embodiment.

In the illustrated embodiments, a motor vehicle wheel 2 is fixed to a main shaft 15 which is supported rotatably about an axis of rotation 1 on the frame structure of a wheel balancing machine (not shown) in known manner, for example as is illustrated in WO 00/14503. In an unbalance measuring run the motor vehicle wheel 2 is rotated about the axis of rotation 1 and forces resulting from a wheel unbalance are measured by means of force measuring sensors 14 and evaluated in an unbalance evaluation device 17. In the evaluation procedure unbalance parameters are calculated in terms of balancing mass and rotary angle position. The balancing masses are then fixed in the form of balancing weights to the wheel in known manner at the calculated rotary angle positions to compensate for the wheel unbalance.

When the motor vehicle wheel 2 is fixed to the main shaft 15 by way of conventional clamping means, it frequently happens that the geometrical axis 8 of the wheel does not exactly coincide with the axis of rotation 1. That gives rise to unbalance measurement results which are falsified in relation to the actual unbalance of the wheel.

In the illustrated embodiments the precise positioning of the motor vehicle wheel 2 with respect to the axis of rotation 1 and thus the positioning of the geometrical axis 8 of the wheel with respect to the axis of rotation 1 can be determined. In the Figures, for the purposes of explanation, the geometrical axis of the wheel is arranged exaggeratedly eccentrically and with an angle of inclination relative to the axis of rotation 1 of the main shaft 15.

The illustrated embodiments involve the use of a scanning device 3 with which a scanning light beam 21, for example a laser beam, is directed on to a plurality of measurement points which are on the surface of the wheel. A spacing measuring device 4 receives a respective reflected beam 22 and produces a measurement signal proportional to the spacing of the measurement point from a reference location 5. The scanning device 3 and the spacing measuring device 4 can be combined to form a spacing measuring unit 10 or 11, 12 respectively and can be mounted on the machine frame structure pivotably about a common pivot axis which together with a pivot angle sensor 13 forms the reference location 5. It is however also possible to select another reference location 5 which is fixed with respect to the machine.

Preferably the spacing measuring unit 10 is in the form of a triangulation measuring device as is known from EP 1 174 698 A2. The known triangulation measuring device has the scanning device 3 which is in the form of a light source and a CCD-sensor as the spacing measuring device 4. The beam 22 which is reflected from a scanned measurement point is focussed by way of a receiver optical means 18 on to a given position on the CCD-sensor of the spacing measuring device 4. The CCD-sensor can detect separately from each other a plurality of local maxima of an illumination intensity function. The direction of the beam 22 which is reflected from the measurement point depends on the distance of the measurement point relative to the scanning device 3. The reflected beam therefore goes by way of the receiver optical means 18 on to a given position on the CCD-sensor which produces a spacing-dependent measurement signal resulting therefrom.

In the illustrated embodiments, the position of the motor vehicle wheel 2 is determined with respect to the axis of rotation 1 by a procedure involving scanning a plurality of measurement points disposed on at least two peripheries around the axis of rotation 1. Those peripheries are in planes 19, 20 perpendicular to the axis of rotation 1, on a part of the wheel, preferably the wheel rim 9. For the purposes of implementing the position-measurement procedure, the spacings of two measurement points which are in two planes 19 and 20 on at least two such peripheries are determined in relation to the reference location 5 on the machine.

In the embodiment illustrated in FIG. 1 the scanning light beam 21 is directed on to measurement points in the plane 19. The motor vehicle wheel 2 which is clamped on the main shaft 15 is rotated so that provided on the periphery of the scanned part of the wheel is a number of measurement points which for example corresponds to the number of light pulses, more particularly laser pulses. The respectively reflected light beams 22 are received by the spacing measurement device 4 and, as already explained, converted into corresponding spacing measurement signals.

After the operation of measuring the spacings of the measurement points which are in the plane 19, the scanning light beam 21 is directed on to the peripheral part of the wheel (being the wheel rim 9) in the plane 20. The spacings of the measurement points which are on the periphery of that part of the wheel are also measured in that plane, as discussed above, while the wheel is rotating.

The planes 19 and 20 which are perpendicular to the axis of rotation 1 can be so disposed that the measurement points are on a corresponding inside periphery of the wheel rim 9. The at least two planes 19 and 20 can be so disposed that they intersect surface portions of the wheel rim 9, which extend substantially parallel to the axis of rotation 1. That is the case for example with the plane 20. In addition the respective plane can be so disposed that it intersects a part of the rim extending inclinedly or substantially perpendicularly with respect to the axis of rotation 1, as is the case with the plane 19.

As the common pivot axis at the reference location 5, about which the scanning device 3 and the spacing measuring device 4 are pivotable, is provided fixedly on the frame structure of the machine and the precise positioning of the scanning device 3 and the spacing measuring device 4 on the frame structure of the machine and thus with respect to the axis of rotation 1 is determined by means of the pivot angle sensor 13, that provides exact spacing measurements in respect of the measurement points in the two planes 19 and 20 with respect to the axis 1 of the wheel. As already discussed above, it is also possible to adopt another reference location which is provided fixedly on the frame structure of the machine.

The respective rotary angle position is also determined for the respective measurement points, by means of a rotary angle sensor 6. The rotary angle sensor 6 as well as the spacing measuring device 4 and the pivot angle sensor 13 are connected to an electronic evaluation system 7. The scanning device 3 which emits the scanning light beam 21 in pulsed mode is also connected to the electronic evaluation system 7 in order to determine the respective rotary angle position of the measurement point being scanned.

The evaluation device 7 includes a computer which, from the spacing measurement values in respect of the respective measurement points and the associated rotary angle measurement values of the rotary angle sensor 6, computes the positioning of the measurement points disposed on an inside surface of the wheel rim, in the two planes 19 and 20, with respect to the axis of rotation 1. The position of the motor vehicle wheel 2 with respect to the axis of rotation 1 can be directly derived therefrom. That positional information can include an eccentric and/or inclined position of the geometrical axis 8 of the wheel with respect to the axis of rotation 1, which causes falsification of the measurement values in regard to wheel unbalance, as are ascertained by the force measuring sensors 14.

The deviations of the position of the geometrical axis 8 of the wheel from the axis of rotation 1, in other words the exact positioning of the motor vehicle wheel 2 with respect to the axis of rotation 1, can be fed as correction values to an error compensating device 16. The error compensating device 16 provides for suitable correction of the balancing parameters (balancing mass and angular position) which are calculated in the unbalance evaluation device 17.

Figure 2:
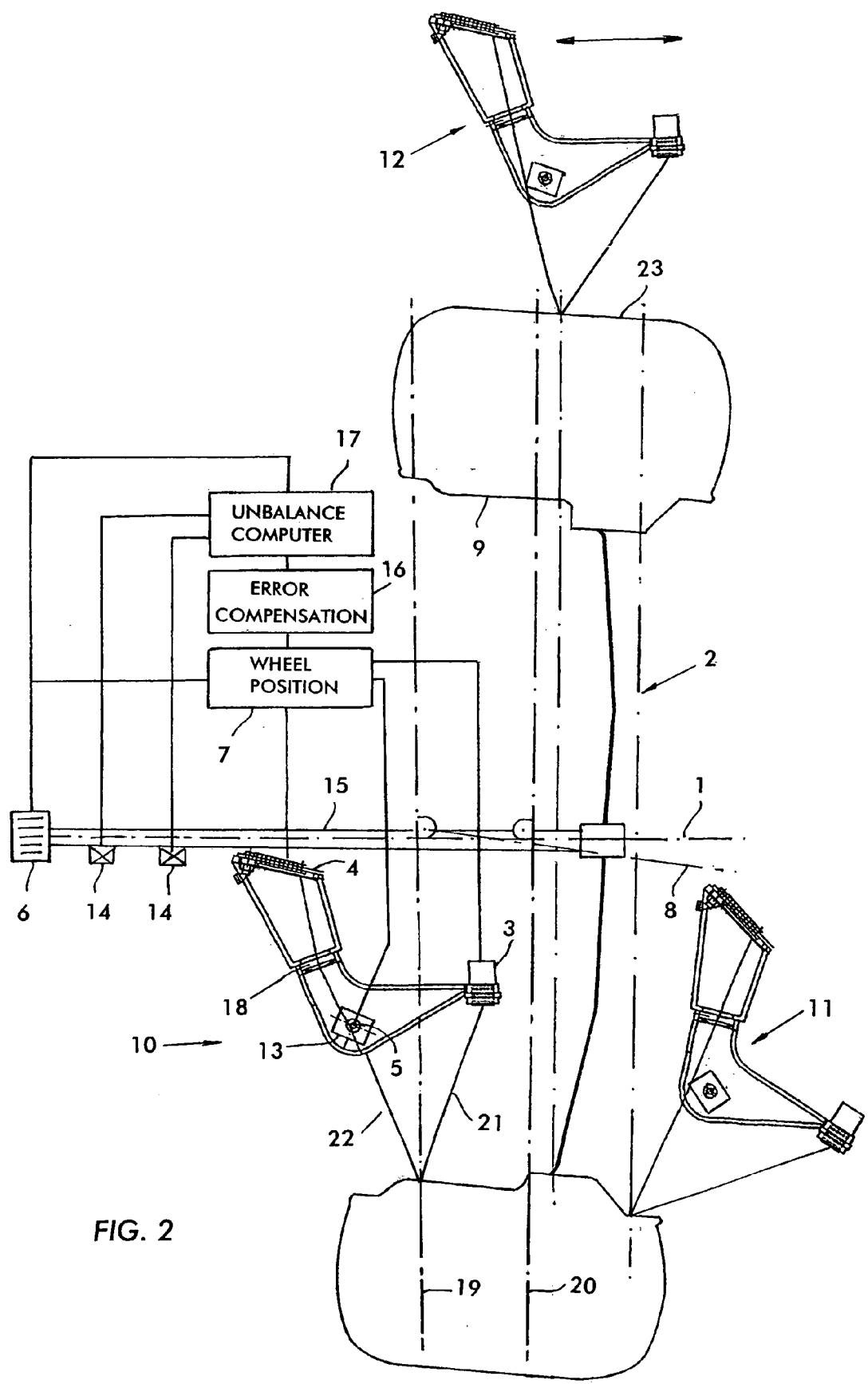
FIG. 2 shows a second embodiment.

In the case of the embodiment illustrated in FIG. 1, a spacing measurement operation is effected in the region of the inner peripheral surface of the inward part of the wheel rim. It is however also possible to implement the spacing measuring operation at the outwardly disposed part of the rim by means of a spacing measuring unit 11 which is of the same structure as the spacing measuring unit 10 (see FIG. 2). It is also possible to provide for evaluation of the spacing values which were ascertained by the two spacing measuring units 10 and 11. For that purpose the spacing measuring unit 11 is also connected to the electronic evaluation system 7.

It is also possible to use the spacing measuring unit 11 which carries out spacing measurement procedures on the outwardly disposed part of the wheel rim to implement operations for determining the positions of wheels which are mounted to the motor vehicle, in the manner as was described above with reference to FIG. 1. In that case the axis of rotation 1 is determined by the respective rotatable wheel fixing on the motor vehicle.

The spacing measuring unit 10 or 11 or also both spacing measuring units 10 and 11 can be used to ascertain the wheel profiles, in particular the profiles of the wheel rim 9 at the inside and/or outside of the wheel, as is known from EP 1 174 698 A2. It is in dependence thereon that it is possible to determine optimum positions for balancing weights on the wheel rim 9.

It is also possible to use the spacing measuring units 10 and 11 to scan the pneumatic tyre 23 of the motor vehicle wheel in respect of geometrical irregularities such as lateral wobble or run-out or radial wobble or run-out. For that purpose, it is also possible to provide an additional spacing measuring unit 12 which can be directed on to the tread surface of the pneumatic tyre 23. For that purpose the spacing measuring unit 12 can be displaced parallel to the axis of rotation 1 and can possibly be mounted pivotably about a pivot axis.

When scanning the pneumatic tyre 23, particularly when the wheel is rotating, with different degrees of inflation of the pneumatic tyre, it is possible to detect irregularities in the tyre, in particular in regard to differences in tyre stiffness, by means of the spacing measurements in respect of the measurement points on different peripheries at the side walls of the pneumatic tyre 23 and/or at the tread surface of the pneumatic tyre.

The invention thus provides a comprehensive diagnosis of the quality of the motor vehicle wheel and also the motor vehicle tyre by contactless scanning.

The invention claimed is:

1. A method of determining geometrical data of a motor vehicle wheel, the method comprising the steps of:
mounting the wheel rotatably about an axis of rotation on a main shaft of a wheel balancing machine; scanning a plurality of measurement points on the rotating wheel in contactless mode in at least two planes perpendicular to the axis of rotation and on a respective periphery of the corresponding part of the wheel; measuring spacings of said plurality of measurement points from a reference location and rotary angle positions of the respective measurement points; and determining the position of the motor vehicle wheel with respect to the axis of rotation from the measured values of said spacings and said rotary angle positions, the scanning being carried out by a scanning light beam that has an unchanging direction at least during a revolution of the wheel.

2. A method according to claim 1, wherein the at least one of the eccentricity and the angle of inclination of the geometrical axis of the wheel, with respect to the axis of rotation, is determined from the measurement values.

3. A method according to claim 1, wherein the measurement points are scanned on a surface of the part of the wheel, and the part is substantially parallel to the axis of the wheel or a surface of the part of the wheel, which is substantially inclined or perpendicular.

4. A method according to claim 1, wherein a lateral wobble (run out) and/or radial wobble (run out) on the wheel is or are ascertained from the measured values.

5. A method according to claim 1, wherein the measurement points are scanned on parts of the wheel of the inside of the wheel and/or the outside of the wheel and/or at the periphery of the wheel.

6. A method according to claim 1, wherein the position ascertained from the measured values, at least one of the eccentricity and inclination of the geometrical axis of the wheel with respect to the axis of rotation is used for correction of balancing parameters (balancing mass, angular position) which are ascertained in an unbalance measuring operation.

7. A method according to claim 4, wherein by ascertaining the run out data of the rim and the unbalance data of the vehicle wheel in a first positional relationship of the tire and the rim, and by matching the rim and the tire in a second positional relationship the effects of the run out of the rim and of the unbalance of the vehicle wheel will be minimized.

8. A method of determining geometrical data of a motor vehicle wheel mounted rotatably about an axis of rotation, according to claim 1, wherein the spacings of the measurement points on a pneumatic tire of the motor vehicle wheel and on one or more peripheral lines about the axis of rotation, relative to a reference location, are measured at different inflation pressures.

9. A method according to claim 8, further including ascertaining the run out data of the rim and the stiffness data of the tire in a first positional relationship of the tire and the rim, and matching the rim and the tire in a second positional relationship to minimize the effects of the run out of the rim and of the difference of stiffness around the circumference of the tire.

10. A method according to claim 9, wherein tire irregularities, tire stiffness values, in the peripheral direction of the pneumatic tire, are ascertained from the differences in the measured values of the spacings for the respective measurement points.

11. Apparatus for determining geometrical data of a motor vehicle wheel comprising a main shaft of a wheel balancing machine; clamping means to mount the wheel rotatably about an axis of rotation on the main shaft of the wheel balancing machine; a contactless scanning device which scans, with a scanning light beam, measurement points on at least two peripheries on parts of the wheel, the two peripheries being in planes perpendicular to the axis of rotation, wherein a direction of the scanning light beam remains unchanged at least during revolution of the wheel; a spacing measuring device connected to the scanning device which measures spacings of the measurement points scanned on the wheel from a reference location; a rotary angle sensor for determining the respective rotary angle positions of the scanned measurement points during rotation of the wheel about the axis of rotation; and an evaluation device to which the spacing measuring device and the rotary angle sensor are connected, wherein the evaluation device has a computer which determines the position of the motor vehicle wheel and the position of the geometrical axis of the wheel with respect to the axis of rotation from the spacings of the measurement points from the reference location and the respective rotary angle positions of the measurement points.

12. Apparatus according to claim 11, wherein the scanning device and the spacing measuring device form a movable spacing measuring unit.

13. Apparatus according to claim 12, wherein the spacing measuring unit is in the form of a triangulation measuring device.

14. Apparatus according to claim 11, wherein there are provided three spacing measuring units of which respective spacing measuring units are directed on to the inside of the wheel, the outside of the wheel and the peripheral surface of the wheel.

15. Apparatus according to claim 14, wherein the spacing measuring units directed on to the inside of the wheel and the outside of the wheel are mounted pivotably.

16. Apparatus according to claim 14, wherein the spacing measuring unit directed on to the peripheral surface of the wheel is mounted so as to be displaceable parallel to the axis of rotation.

17. Apparatus according to claim 11, wherein the rotary angle sensor is non-rotatably coupled to the motor vehicle wheel.

* * * * *